US005773516A

United States Patent [19]
Hüffer et al.

[11] Patent Number: 5,773,516
[45] Date of Patent: Jun. 30, 1998

[54] PROPYLENE POLYMERS

[75] Inventors: Stephan Hüffer, Ludwigshafen; Meinolf Kersting, Neustadt; Franz Langhauser; Rainer Alexander Werner, both of Bad Dürkheim; Stefan Seelert, Frankenthal; Patrik Müller, Kaiserslautern; Jürgen Kerth, Carlsberg, all of Germany

[73] Assignee: BASF Aktiengesellschaft, Ludwigshafen, Germany

[21] Appl. No.: 761,341

[22] Filed: Dec. 6, 1996

[51] Int. Cl.[6] ............................... C08F 10/00; C08F 4/64
[52] U.S. Cl. ......................... 525/242; 525/322; 525/323
[58] Field of Search ................................. 525/322, 323, 525/242

[56] References Cited

U.S. PATENT DOCUMENTS

| | | | |
|---|---|---|---|
| 4,857,613 | 8/1989 | Zolk et al. | 526/128 |
| 5,288,824 | 2/1994 | Kerth et al. | 526/128 |
| 5,461,115 | 10/1995 | Oka | 525/247 |
| 5,468,810 | 11/1995 | Hyakawa et al. | 525/244 |
| 5,473,021 | 12/1995 | Koura et al. | 525/247 |
| 5,486,572 | 1/1996 | Fujita et al. | 525/247 |

FOREIGN PATENT DOCUMENTS

| | | |
|---|---|---|
| 0 014 523 | 8/1980 | European Pat. Off. . |
| 0 023 425 | 2/1981 | European Pat. Off. . |
| 0 045 975 | 2/1982 | European Pat. Off. . |
| 0 045 977 | 2/1982 | European Pat. Off. . |
| 0 086 473 | 8/1983 | European Pat. Off. . |
| 0 171 200 | 2/1986 | European Pat. Off. . |
| 0 195 497 | 9/1986 | European Pat. Off. . |
| 2 111 066 | 6/1983 | United Kingdom . |

*Primary Examiner*—Irina S. Zemel
*Attorney, Agent, or Firm*—Keil & Weinkauf

[57] ABSTRACT

Propylene polymers which comprise from 25 to 97% by weight of a propylene polymer (I) containing from 0 to 15% by weight of copolymerized $C_2$–$C_{10}$-alk-1-enes and also comprise from 3 to 75% by weight of a further propylene polymer (II) containing from 15 to 80% by weight of copolymerized $C_2$–$C_{10}$-alk-1-enes, are obtainable by two-stage polymerization of propylene and $C_2$–$C_{10}$-alk-1-enes in the presence of a Ziegler-Natta catalyst system which comprises a titanium-containing solid component a) comprising a compound of magnesium, a halogen, silica gel as support and a carboxylic ester as electron donor compound, and also as cocatalysts an aluminum compound b) and a further electron donor compound c), where, in a first polymerization stage, propylene is polymerized in the presence or absence of further $C_2$–$C_{10}$-alk-1-enes at from 50° to 100° C., pressures in the range from 15 to 40 bar and a mean residence time of from 0.5 to 5 hours and subsequently, in a second polymerization stage, a mixture of propylene and further $C_2$–$C_{10}$-alk-1-enes is polymerized at from 30° to 100° C., pressures in the range from 15 to 40 bar and mean residence times of from 0.5 to 5 hours onto the propylene polymer obtained from the first polymerization stage, and the silica gel used as support for the titanium-containing solid component has a mean particle diameter of from 5 to 200 μm, a mean particle diameter of the primary particles of from 1 to 10 μm and voids or channels having a mean diameter of from 1 to 10 μm, which voids or channels have a macroscopic volume as a proportion of the total particle in the range from 5 to 20%.

9 Claims, No Drawings

PROPYLENE POLYMERS

The present invention relates to a propylene polymer which comprises from 25 to 97% by weight of a propylene polymer (I) containing from 0 to 15% by weight of copolymerized $C_2$–$C_{10}$-alk-1-enes and also comprises from 3 to 75% by weight of a further propylene polymer (II) containing from 15 to 80% by weight of copolymerized $C_2$–$C_{10}$-alk-1-enes, obtainable by two-stage polymerization of propylene and $C_2$–$C_{10}$-alk-1-enes in the presence of a Ziegler-Natta catalyst system which comprises a titanium-containing solid component a) comprising a compound of magnesium, a halogen, silica gel as support and a carboxylic ester as electron donor compound, and also as cocatalysts an aluminum compound b) and a further electron donor compound c), where, in a first polymerization stage, propylene is polymerized in the presence or absence of further $C_2$–$C_{10}$-alk-1-enes at from 50° to 100° C., pressures in the range from 15 to 40 bar and a mean residence time of from 0.5 to 5 hours and subsequently, in a second polymerization stage, a mixture of propylene and further $C_2$–$C_{10}$-alk-1-enes is polymerized at from 30° to 100° C., pressures in the range from 15 to 40 bar and mean residence times of from 0.5 to 5 hours onto the propylene polymer obtained from the first polymerization stage, and the silica gel used as support for the titanium-containing solid component has a mean particle diameter of from 5 to 200 μm, a mean particle diameter of the primary particles of from 1 to 10 μm and voids or channels having a mean diameter of from 1 to 10 μm, which voids or channels have a macroscopic volume as a proportion of the total particle in the range from 5 to 20%.

In addition, the present invention relates to a process for preparing such propylene polymers and their use as films, fibers and moldings.

Catalyst systems of the Ziegler-Natta type are known, for example, from EP-B 014523, EP-A 023425, EP-A 045975 and EP-A 195497. These systems are used, in particular, for the polymerization of $C_2$–$C_{10}$-alk-1-enes and contain, inter alia, compounds of polyvalent titanium, aluminum halides and/or aluminum alkyls, and also electron donor compounds, in particular silicon compounds, ethers, carboxylic esters, ketones and lactones which are used both in connection with the titanium component and also as cocatalyst.

The Ziegler-Natta catalysts are customarily prepared in two steps. The titanium-containing solid component is prepared first and subsequently reacted with the cocatalyst. The polymerization is then carried out by means of the catalysts thus obtained.

Furthermore, U.S. Pat. No. 4,857,613 and U.S. Pat. No. 5,288,824 describe catalyst systems of the Ziegler-Natta type comprising not only a titanium-containing solid component and an aluminum compound but also organic silane compounds as external electron donor compounds. The catalyst systems thus obtained have a good productivity and give polymers of propylene having a high stereospecificity, ie. a high isotacticity, a low chlorine content and a good morphology, ie. a low fines content.

For some applications of propylene polymers, it is necessary for these to have a high stiffness and only a small proportion of xylene-soluble polymers and chlorine. This is the case, for example, for food containers produced from such propylene polymers. The propylene polymers known from U.S. Pat. No. 4,857,613 and U.S. Pat. No. 5,288,824 do not meet these requirements to a sufficient extent.

It is an object of the present invention to develop, starting from the propylene polymers described in U.S. Pat. No. 4,857,613 and U.S. Pat. No. 5,288,824, further improved propylene polymers which do not have the abovementioned disadvantages.

We have found that this object is achieved by the propylene polymers defined in the introduction.

The propylene polymers of the present invention are obtainable by polymerization in the presence of a Ziegler-Natta catalyst system which comprises a titanium-containing solid component a) comprising a compound of magnesium, a halogen, silica gel as support and a carboxylic ester as electron donor compound, and also as cocatalysts an aluminum compound b) and a further electron donor compound c).

Titanium compounds used for preparing the titanium-containing solid component a) are generally halides or alkoxides of trivalent or tetravalent titanium, with the chlorides of titanium, particularly titanium tetrachloride, being preferred. The titanium-containing solid component additionally contains silica gel as support.

Compounds of magnesium are also used, inter alia, in the preparation of the titanium-containing solid component. Suitable magnesium compounds are, in particular, magnesium halides, magnesium alkyls and magnesium aryls, and also magnesium alkoxy and magnesium aryloxy compounds, with preference being given to using magnesium dichloride, magnesium dibromide and di($C_1$–$C_{10}$-alkyl)magnesium compounds. In addition, the titanium-containing solid component can contain additional halogen, preferably chlorine or bromine.

The titanium-containing solid component a) additionally contains electron donor compounds, for example monofunctional or polyfunctional carboxylic acids, carboxylic anhydrides and carboxylic esters, also ketones, ethers, alcohols, lactones, or organophosphorus and organosilicon compounds. As electron donor compounds within the titanium-containing solid component, preference is given to using phthalic acid derivatives of the general formula (II)

where X and Y are each a chlorine atom or a $C_1$–$C_{10}$-alkoxy radical or together are oxygen. Particularly preferred electron donor compounds are phthalic esters where X and Y are each a $C_1$–$C_8$-alkoxy radical, for example a methoxy, ethoxy, propyloxy or butyloxy radical.

Further preferred electron donor compounds within the titanium-containing solid component are, inter alia, diesters of 3- or 4-membered, unsubstituted or substituted cycloalkyl-1,2-dicarboxylic acids, and also monoesters of unsubstituted or substituted benzophenone-2-carboxylic acids. The hydroxy compounds used for forming these esters are the alcohols customary in esterification reactions, for example $C_1$–$C_{15}$-alkanols, $C_5$–$C_7$-cycloalkanols, which can in turn bear $C_1$–$C_{10}$-alkyl groups, also $C_6$–$C_{10}$-phenols.

The titanium-containing solid component can be prepared by methods known per se. Examples of such methods are described, inter alia, in EP-A 45 975, EP-A 45 977, EP-A 86 473, EP-A 171 200, GB-A 2 111 066, U.S. Pat. No. 4,857,613 and U.S. Pat. No. 5,288,824.

In the preparation of the titanium-containing solid component a), the following two-stage process is preferably employed:

In the first stage, silica gel ($SiO_2$) as finely divided support, which generally has a mean particle diameter of from 5 to 200 μm, in particular from 20 to 70 μm, a pore volume of from 0.1 to 10 cm³/g, in particular from 1.0 to 4.0 cm³/g, and a specific surface area of from 10 to 1000 m²/g, in particular from 100 to 500 m²/g, is first reacted with a solution of the magnesium-containing compound in a liquid alkane, after which this mixture is stirred for from 0.5 to 5 hours at from 10° to 120° C. Preferably, from 0.1 to 1 mol of the magnesium compound is used per mole of the support. Subsequently, a halogen or a hydrogen halide, in particular chlorine or hydrogen chloride, in an at least twofold, preferably at least fivefold, molar excess based on the magnesium-containing compound is added while stirring continually. After about 30–120 minutes, this reaction product is admixed at from 10° to 150° C. with a $C_1$–$C_8$-alkanol, in particular ethanol, a halide or an alkoxide of trivalent or tetravalent titanium, in particular titanium tetrachloride, and also an electron donor compound. Here, from 1 to 5 mol of the trivalent or tetravalent titanium and from 0.01 to 1 mol, in particular from 0.2 to 0.6 mol, of the electron donor compound are used per mole of magnesium in the solid obtained from the first stage. This mixture is stirred for at least 30 minutes at from 10° to 150° C., the solid thus obtained is subsequently filtered off and washed with a $C_7$–$C_{10}$-alkylbenzene, preferably with ethylbenzene.

In the second stage, the solid obtained from the first stage is extracted for at least one hour at from 100° to 150° C. with excess titanium tetrachloride or an excess of a solution of titanium tetrachloride in an inert solvent, preferably an alkylbenzene, with the solvent containing at least 5% by weight of titanium tetrachloride. The product is then washed with a liquid alkane until the titanium tetrachloride content of the washings is less than 2% by weight.

The titanium-containing solid component obtainable in this way is used together with a cocatalyst as Ziegler-Natta catalyst system. An example of a suitable cocatalyst is an aluminum compound b).

Aluminum compounds b) suitable as cocatalysts are trialkylaluminum and also such compounds in which an alkyl group is replaced by an alkoxy group or by a halogen atom, for example by chlorine or bromine. Preference is given to using trialkylaluminum compounds whose alkyl groups each have from 1 to 8 carbon atoms, for example trimethylaluminum, triethylaluminum or methyldiethylaluminum.

Preferably, use is made not only of the aluminum compound b) but also, as further cocatalyst, electron donor compounds c) such as, for example, monofunctional or polyfunctional carboxylic acids, carboxylic anhydrides and carboxylic esters, also ketones, ethers, alcohols, lactones, or organophosphorus and organosilicon compounds. Preferred electron donor compounds are here organosilicon compounds of the general formula (I)

$$R^1_n Si(OR^2)_{4-n} \tag{I}$$

where
R¹ are identical or different and are each a $C_1$–$C_{20}$-alkyl group, a 5- to 7-membered cycloalkyl group which in turn can bear a $C_1$–$C_{10}$-alkyl group, or a $C_6$–$C_{20}$-aryl or arylalkyl group, R² are identical or different and are each a $C_1$–$C_{20}$-alkyl group and n is 1, 2 or 3. Particular preference is here given to those compounds in which R¹ is a $C_1$–$C_8$-alkyl group or a 5- to 7-membered cycloalkyl group, and R² is a $C_1$–$C_4$-alkyl group and n is 1 or 2.

Among these compounds, particular emphasis may be given to dimethoxydiisopropylsilane, dimethoxyisobutylisopropylsilane, dimethoxydiisobutylsilane, dimethoxydicyclopentylsilane, dimethoxyisobutylsec-butylsilane, diethoxyisopropylsec-butylsilane, diethoxydicyclopentylsilane and diethoxyisobutylisopropylsilane.

The individual compounds b) and, if desired, c) can be used as cocatalyst either individually in any order or as a mixture of two components.

According to the present invention, the silica gel used in the titanium-containing solid component a) is a finely divided silica gel having a mean particle diameter of from 5 to 200 μm, in particular from 20 to 70 μm, and a mean particle diameter of the primary particles of from 1 to 10 μm, in particular from 1 to 5 μm. The primary particles here are porous, granular silica gel particles which are obtained from an $SiO_2$ hydrogel by milling, possibly after appropriate sieving.

Furthermore, the finely divided silica gel to be used according to the present invention also has voids or channels having a mean diameter of from 1 to 10 μm, in particular from 1 to 5 μm, which voids or channels have a macroscopic volume as a proportion of the total particle in the range from 5 to 20%, in particular in the range from 5 to 15%. The finely divided silica gel also has, in particular, a pore volume of from 0.1 to 10 cm³/g, preferably from 1.0 to 4.0 cm³/g, and a specific surface area of from 10 to 1000 m²/g, preferably from 100 to 500 m²/g.

Owing to the voids or channels present in the finely divided silica gel, there is a significantly improved distribution of the active catalyst components in the support material. In addition, a material containing such voids and channels has a positive effect on the diffusion-controlled supply of monomers and cocatalysts and thus also on the polymerization kinetics. Such a finely divided silica gel is obtainable, inter alia, by spray drying milled, appropriately sieved $SiO_2$ hydrogel, which for this purpose is mixed to a paste with water or an aliphatic alcohol. However, such a finely divided silica gel is also commercially available.

The silica gel is preferably present in the titanium-containing solid component a) in such amounts that from 0.1 to 1.0 mol, in particular from 0.2 to 0.5 mol, of the magnesium compound are present per 1 mol of the silica gel.

The cocatalytic compounds b) and, if used, c) can be allowed to act either successively or together on the titanium-containing solid component a). This is usually done at from 0° to 150° C., in particular from 20° to 90° C., and at pressures of from 1 to 100 bar, in particular from 1 to 40 bar.

The cocatalysts b) and, if used, c) are preferably used in such an amount that the atomic ratio of aluminum from the aluminum compound to titanium from the titanium-containing solid component a) is from 10:1 to 800:1, in particular from 20:1 to 200:1, and the molar ratio of the aluminum compound to the electron donor compound c) used as cocatalyst is from 1:1 to 250:1, in particular from 10:1 to 80:1.

The preparation of the propylene polymers of the present invention can be carried out in the customary reactors used for the polymerization of $C_2$–$C_{10}$-alk-1-enes either batchwise or preferably continuously, for example as a suspension polymerization or preferably as a gas-phase polymerization. Suitable reactors include continuously operated stirred reactors containing a fixed bed of finely divided polymer which is customarily kept in motion by suitable stirring equipment. Of course, the reaction can also be carried out in a plurality of reactors connected in series.

The propylene polymers of the present invention comprise from 25 to 97% by weight of a propylene polymer (I) containing from 0 to 15% by weight of copolymerized $C_2$–$C_{10}$-alk-1-enes and also comprise from 3 to 75% by weight of a further propylene polymer (II) containing from 15 to 80% by weight of copolymerized $C_2$–$C_{10}$-alk-1-enes. Preference is given to those propylene polymers which comprise from 35 to 95% by weight of a propylene polymer (I) containing from 0 to 12% by weight of copolymerized $C_2$–$C_{10}$-alk-1-enes and also comprise from 5 to 65% by weight of a propylene polymer (II) containing from 20 to 75% by weight of copolymerized $C_2$–$C_{10}$-alk-1-enes. Particularly preferred propylene polymers comprise from 40 to 93% by weight of a propylene polymer (I) containing from 0 to 9% by weight of copolymerized $C_2$–$C_{10}$-alk-1-enes and also comprise from 7 to 60% by weight of a propylene polymer (II) containing from 25 to 70% by weight of copolymerized $C_2$–$C_{10}$-alk-1-enes. Preferably, it is also possible to use such a propylene polymer comprising, as propylene polymer (I), a propylene homopolymer.

In this context, copolymerized $C_2$–$C_{10}$-alk-1-enes are, in particular, ethylene, propylene, 1-butene, 1-pentene, 1-hexene or 1-octene or mixtures of these, with particular preference being given to using ethylene or 1-butene.

The process leading to the propylene polymers of the present invention, which is likewise subject matter of the present invention, is carried out by first preparing the propylene polymer (I) in a first polymerization stage and subsequently preparing the propylene polymer (II) in a second polymerization stage.

The polymerization of the propylene and, if used, the appropriate $C_2$–$C_{10}$-alk-1-enes in the first polymerization stage is usually carried out at a pressure of from 15 to 40 bar, a temperature of from 50° to 100° C. and a mean residence time of the reaction mixture of from 0.5 to 5 hours. In the preparation of the propylene polymer (I), preference is given to using pressures of from 20 to 35 bar, temperatures of from 60° to 90° C. and mean residence times of from 0.5 to 3 hours. The reaction conditions are here preferably selected in such a way that in this first polymerization stage from 0.05 to 2 kg of the propylene polymer (I) are formed per mmol of the aluminum component. The $C_2$–$C_{10}$-alk-1-ene used here is, in particular, ethylene or 1-butene, or a mixture of these, insofar as the propylene polymer (I) is a copolymer. In this case, in the preparation of the propylene polymer (I), the propylene is copolymerized with the comonomers in such a way that the ratio of the partial pressure of the propylene to that of the comonomers is set to from 10:1 to 1000:1, in particular from 15:1 to 500:1. If propylene is used as $C_2$–$C_{10}$-alk-1-ene, a propylene homopolymer is obtained as propylene polymer (I).

The propylene polymer (I) formed in this way is, after the reaction is complete, taken from the first polymerization stage together with the catalyst and introduced into the second polymerization stage in which the propylene polymer (II) is prepared.

In the second polymerization stage, propylene and one or more $C_2$–$C_{10}$-alk-1-enes are polymerized in the presence of the propylene polymer (I) at pressures of from 15 to 40 bar, temperatures of from 30° to 100° C. and mean residence times of the reaction mixture of from 0.5 to 5 hours. Preference is here given to pressures of from 10 to 25 bar, temperatures of from 40° to 70° C. and mean residence times of from 0.5 to 3 hours. The pressures in the second polymerization stage are usually at least 7 bar, preferably at least 10 bar, below those in the first polymerization stage. The $C_2$–$C_{10}$-alk-1-ene used is particularly preferably ethylene or 1-butene, or a mixture of these. To prepare the propylene polymer (II), the propylene is copolymerized with the comonomers in such a way that the ratio of the partial pressure of the propylene to that of the comonomers is set to from 0.5:1 to 20:1, in particular from 0.5:1 to 15:1. Furthermore, care should be taken to ensure, by means of appropriate selection of the polymerization parameters, that the weight ratio of the monomers reacted in the first polymerization stage to those reacted in the second polymerization stage is in the range from 0.5:1 to 20:1, in particular in the range from 0.6:1 to 10:1.

In the second polymerization stage, the incorporation of the comonomers into the polymer chain can be regulated by addition of appropriate amounts of $C_1$–$C_8$-alkanols, in particular isopropanol.

The molecular weight of the propylene polymers of the present invention can be controlled and adjusted over a wide range by addition of regulators customary in polymerization technology, for example hydrogen. Furthermore, it is possible to concomitantly use inert solvents such as toluene or hexane, inert gas such as nitrogen or argon and relatively small amounts of polypropylene powder. The propylene polymers of the present invention preferably have molecular weights (number average) of from 20,000 to 500,000. Their melt flow indices at 230° C. and under a load of 2.16 kg in accordance with DIN 53 735 are in the range from 0.1 to 100 g/10 min, in particular in the range from 0.5 to 50 g/10 min.

In comparison with propylene polymers known hitherto, the propylene polymers of the present invention are notable, in particular, for reduced amounts of xylene-soluble material, ie. they have an improved stereospecificity and a higher stiffness. Furthermore, they also have reduced chlorine contents. The productivity of the process used for preparing these propylene polymers is significantly increased in comparison with the known processes.

Owing to their good mechanical properties, the propylene polymers of the present invention are particularly suitable for the production of films, fibers and moldings.

EXAMPLES 1 TO 6 AND COMPARATIVE EXAMPLES A TO F

Example 1 a) Preparation of the titanium-containing solid component (1)

In a first stage, finely divided silica gel ($SiO_2$) having a particle diameter of from 20 to 45 $\mu$m, a pore volume of 1.5 cm$^3$/g and a specific surface area of 260 m$^2$/g was admixed with a solution of n-butyloctylmagnesium in n-heptane, with 0.3 mol of the magnesium compound being used per mole of $SiO_2$. The finely divided silica gel additionally had a mean particle size of the primary particles of 3–5 $\mu$m and voids and channels having a diameter of 3–5 $\mu$m, with the macroscopic volume of the voids and channels as a proportion of the total particle being about 15%. The mixture was stirred for 45 minutes at 95° C., then cooled to 20° C., after which 10 times the molar amount, based on the organomagnesium compound, of hydrogen chloride was passed in. After 60 minutes, the reaction product was admixed while stirring continually with 3 mol of ethanol per mole of magnesium. This mixture was stirred for 0.5 hours at 80° C. and subsequently admixed with 7.2 mol of titanium tetrachloride and 0.5 mol of di-n-butyl phthalate, in each case based on 1 mol of magnesium. Subsequently, the mixture was stirred for 1 hour at 100° C., the solid thus obtained was filtered off and washed a number of times with ethylbenzene.

The solid product obtained in this way was extracted for 3 hours at 125° C. with a 10% strength by volume solution of titanium tetrachloride in ethylbenzene. The solid product was then separated from the extractant by filtration and washed with n-heptane until the washings contained only 0.3% by weight of titanium tetrachloride.

The titanium-containing solid component comprised 3.5% by weight of Ti 7.4% by weight of Mg 28.2% by weight of Cl.

The particle diameter was determined by Coulter Counter analysis (particle size distribution of the silica gel particles), the pore volume and the specific surface area were determined by nitrogen adsorption in accordance with DIN 66131 or by mercury porosymmetry in accordance with DIN 66133. The mean particle size of the primary particles, the diameter of the voids and channels and their macroscopic proportion by volume were determined by means of scanning electron microscopy or electron probe microanalysis, in each case on particle surfaces and on particle cross sections of the silica gel.

b) Polymerization

The preparation of the propylene polymers was carried out in a cascade of two vertically stirred gas-phase reactors connected in series and having a utilizable capacity of 200 l in each case in the presence of hydrogen as molecular weight regulator. Both reactors contained an agitated fixed bed of finely divided polymer.

Gaseous propylene was introduced into the first gas-phase reactor and continuously polymerized under the temperature and pressure conditions shown in Table 1. This was carried out at a mean residence time of about 1.5 hours, with 1.7 g/h of the titanium-containing solid component a) and also 120 mmol/h of triethylaluminum and 10 mmol/h of dimethoxy-isobutylisopropylsilane as cocatalyst being used.

The propylene homopolymer obtained after completion of the gas-phase polymerization was subsequently transferred together with still active catalyst constituents into the second gas-phase reactor. There, a mixture of propylene and ethylene was continuously polymerized onto this propylene homopolymer under the conditions shown in Table 1 below (pressure, temperature, partial pressure ratio of propylene to ethylene, weight ratio of monomers reacted in the first stage to monomers reacted in the second stage) and at a mean residence time of about 1.5 hours in the presence of isopropanol as regulator. The same catalyst as used in the first reactor was employed.

Comparitive Example A

Using a method similar to Example 1 according to the present invention, a propylene homopolymer was first prepared in the first reactor, this was then transferred to the second reactor and a mixture of propylene and ethylene was polymerized onto the propylene homopolymer there. This was carried out under similar reaction conditions to those described in Example 1, but using a titanium-containing solid component a) comprising a granular silica gel having the following properties:

| Particle diameter: | 20–45 $\mu$m |
|---|---|
| Pore volume: | 1.8 cm$^3$/g |
| Specific surface area: | 325 m$^2$/g |
| Proportion of voids and channels based on the total particle: | <1.0% |

Examples 2 to 4

The weight ratio of monomers reacted in the first stage to monomers reacted in the second stage was varied as shown in Table 1.

Comparitive Examples B to D

The procedures of the Examples 2 to 4 according to the present invention were each repeated, but using a catalyst system comprising a titanium-containing solid component a) comprising a granular silica gel having the following properties:

| Particle diameter: | 20–45 $\mu$m |
|---|---|
| Pore volume: | 1.8 cm$^3$/g |
| Specific surface area: | 325 m$^2$/g |
| Proportion of voids and channels based on the total particle: | <1.0% |

The reaction conditions in each case are shown in Table 1 below.

TABLE 1

Reaction conditions

| | Example 1 | Comparative Example A | Example 2 | Comparative Example B | Example 3 | Comparative Example C | Example 4 | Comparative Example D |
|---|---|---|---|---|---|---|---|---|
| Polymerization stage 1: | | | | | | | | |
| Pressure [bar] | 30 | 30 | 32 | 32 | 30 | 30 | 30 | 30 |
| Temperature [°C.] | 80 | 80 | 80 | 80 | 80 | 80 | 80 | 80 |
| Polymerization stage 2: | | | | | | | | |
| Pressure [bar] | 20 | 20 | 20 | 20 | 23 | 23 | 20 | 20 |
| Temperature [°C.] | 70 | 70 | 70 | 70 | 70 | 70 | 70 | 70 |
| Partial pressure ratio propylene:ethylene | 1.8 | 1.8 | 2.2 | 2.2 | 2.25 | 2.25 | 2.2 | 2.2 |
| Weight ratio of monomers reacted in the first stage:monomers reacted in the second stage | 8.5 | 8.5 | 4.0 | 4.0 | 1.7 | 1.7 | 1.1 | 1.1 |
| Amount of isopropanol used [mmol/h] | 254 | 180 | 145 | 103 | 65 | 42 | 27 | 15 |

Table 2 below shows, for each of the Examples 1 to 4 according to the present invention and for each of the Comparative Examples A to D, the productivities in the two polymerization stages 1 and 2, and the following properties of the propylene polymers obtained: proportion of xylene-soluble material (measure of the stereospecificity), melt flow index, stiffness (G modulus), impact toughness, notched impact toughness at –20° C. and at –40° C. and chlorine content.

This shows, inter alia, that the Examples 1 to 4 according to the present invention have, in comparison with the Comparative Examples A to D, a significantly increased productivity and lead to propylene polymers having an improved stiffness and lower proportions of xylene-soluble material and also a reduced chlorine content.

TABLE 2

Properties of the propylene polymers obtained

|  | Example 1 | Comparative Example A | Example 2 | Comparative Example B | Example 3 | Comparative Example C | Example 4 | Comparative Example D |
|---|---|---|---|---|---|---|---|---|
| Polymerization stage 1: |  |  |  |  |  |  |  |  |
| Proportion of xylene-soluble material [%] | 1.1 | 2.3 | 1.0 | 1.9 | 0.9 | 1.7 | 1.0 | 1.8 |
| Polymerization stage 2: |  |  |  |  |  |  |  |  |
| Melt flow index [g/10 min.][a] | 15.3 | 15.0 | 2.1 | 2.2 | 3.7 | 3.5 | 2.1 | 1.8 |
| Stiffness (G modulus) [N/mm$^2$][b] | 950 | 873 | 590 | 523 | 425 | 350 | 325 | 273 |
| Impact toughness at −20° C. [kJ/m$^2$][c] |  |  | 0% fracture | 0% fracture | 0% fracture | 0% fracture | 0% fracture | 0% fracture |
| Notched impact toughness at −20° C.[c] [kJ/m$^2$] |  |  | 7.0 | 6.9 | 0% fracture | 0% fracture | 0% fracture | 0% fracture |
| Notched impact toughness at −40° C.[c] [kJ/m$^2$] |  |  | 4.8 | 4.6 | 9.8 | 9.4 | 0% fracture | 0% fracture |
| Chlorine content [ppm] | 12 | 21 | 13 | 23.8 | 8.3 | 13.3 | 10.2 | 15.2 |
| Productivity [g of polymer/g of titanium-containing solid component] | 23500 | 13600 | 21700 | 12000 | 34100 | 21500 | 27700 | 18700 |

[a] at 230° C. and 2.16 kg, in accordance with DIN 53 735;
[b] in accordance with DIN 53 445;
[c] in accordance with DIN 53 453

Examples 5 and 6

To prepare the propylene polymers consisting of two propylene copolymers (I) and (II), the same catalyst system and the same reactor cascade as in Example 1 were used.

In these Examples, a mixture of propylene and ethylene was first polymerized in the first polymerization stage at a mean residence time of 1.5 hours under the conditions shown in Table 3. The propylene copolymer (I) thus obtained subsequently had a mixture of propylene and ethylene polymerized onto it in the second polymerization stage at a mean residence time of 1.5 hours in the presence of isopropanol as regulator under the conditions shown in Table 3.

Comparitive Examples E and F

The procedures of the Examples 5 and 6 according to the present invention were repeated, but using a catalyst system comprising a titanium-containing solid component a) comprising a granular silica gel having the following properties:

| Particle diameter: | 20–45 μm |
|---|---|
| Pore volume: | 1.8 cm$^3$/g |
| Specific surface area: | 325 m$^2$/g |
| Proportion of voids and channels based on the total particle: | <1.0% |

The reaction conditions in each case are shown in Table 3 below.

TABLE 3

Reaction conditions

|  | Example 5 | Comparative Example E | Example 6 | Comparative Example F |
|---|---|---|---|---|
| Polymerization stage 1: |  |  |  |  |
| Partial pressure ratio propylene:ethylene | 98 | 98 | 98 | 98 |
| Pressure [bar] | 25 | 25 | 28 | 28 |
| Temperature [°C.] | 80 | 80 | 70 | 70 |
| Polymerization stage 2: |  |  |  |  |
| Pressure [bar] | 15 | 15 | 20 | 20 |
| Temperature [°C.] | 70 | 70 | 80 | 80 |
| Partial pressure ratio propylene:ethylene | 1.5 | 1.4 | 2.2 | 2.2 |
| Weight ratio of monomers reacted in the first stage: monomers reacted in the second stage | 5.1 | 5.0 | 1.35 | 1.30 |
| Ratio of mmol of isopropanol:mmol of aluminum component | 1.7 | 1.2 | 0.4 | 0.3 |

Table 4 below shows, for each of the Examples 5 and 6 according to the present invention and for each of the Comparative Examples E and F, the melt flow indices, the contents of copolymerized ethylene and the proportions of xylene-soluble material in the propylene copolymer (I) or (II). Table 4 also gives the following data on the propylene polymer: productivity, stiffness (G modulus), impact toughness, notched impact toughness at −20° C. and at −40° C. and chlorine contents.

This shows, inter alia, that the Examples 5 and 6 according to the present invention have, in comparison with the Comparative Examples E and F, a significantly increased productivity and lead to propylene polymers having an improved stiffness and lower proportions of xylene-soluble material and also a reduced chlorine content.

TABLE 4

Properties of the propylene polymers obtained

| | Example 5 | Comparative Example E | Example 6 | Comparative Example F |
|---|---|---|---|---|
| Polymerization stage 1: | | | | |
| Content of copolymerized ethylene [% by weight] | 1.0 | 1.8 | 2.7 | 2.5 |
| Melt flow index [g/10 min.][a] | 9.4 | 9.7 | 5.1 | 5.2 |
| Proportion of xylene-soluble material [%] | 2.4 | 3.3 | 4.1 | 5.7 |
| Polymerization stage 2: | | | | |
| Melt flow index [g/10 min.][a] | 8.3 | 8.1 | 1.7 | 1.6 |
| Stiffness (G modulus) [N/mm$^2$][b] | 590 | 530 | 265 | 213 |
| Impact toughness at −20° C. [kJ/m$^2$][c] | 0% fracture | 0% fracture | 0% fracture | 0% fracture |
| Notched impact toughness at −20° C. [kJ/m$^2$][c] | 2.3 | 2.1 | 0% fracture | 0% fracture |
| Notched impact toughness at −40° C. [kJ/m$^2$][c] | 2.1 | 1.8 | 16.1 | 15.6 |
| Content of copolymerized ethylene [% by weight] | 14.7 | 15.0 | 28.1 | 27.9 |
| Proportion of xylene-soluble material [% by weight] | 13 | 15 | 38 | 42 |
| Productivity [g of polymer/g of titanium-containing solid component] | 30000 | 21300 | 30200 | 20800 |
| Chlorine content [ppm] | 9.4 | 13.4 | 9.3 | 13.7 |

[a] at 230° C. and 2.16 kg, in accordance with DIN 53 735;
[b] in accordance with DIN 53 445;
[c] in accordance with DIN 53 453

We claim:

1. A propylene polymer which comprises from 25 to 97% by weight of a propylene polymer (I) containing from 0 to 15% by weight of copolymerized $C_2$–$C_{10}$-alk-1-enes and also comprises from 3 to 75% by weight of a further propylene polymer (II) containing from 15 to 80% by weight of copolymerized $C_2$–$C_{10}$-alk-1-enes, obtained by two-stage polymerization of propylene and $C_2$–$C_{10}$-alk-1-enes in the presence of a Ziegler-Natta catalyst system which comprises a titanium-containing solid component a) comprising a compound of magnesium, a halogen, silica gel as support and a carboxylic ester as electron donor compound, and also as cocatalysts an aluminum compound b) and a further electron donor compound c), where, in a first polymerization stage, propylene is polymerized in the presence or absence of further $C_2$–$C_{10}$-alk-1-enes at from 50° to 100° C., pressures in the range from 15 to 40 bar and a mean residence time of from 0.5 to 5 hours and subsequently, in a second polymerization stage, a mixture of propylene and further $C_2$–$C_{10}$-alk-1-enes is polymerized at from 30° to 100° C., pressures in the range from 15 to 40 bar and mean residence times of from 0.5 to 5 hours onto the propylene polymer (I) obtained from the first polymerization stage, and the silica gel used as support for the titanium-containing solid component has a mean particle diameter of from 5 to 200 μm, a mean particle diameter of the primary particles of from 1 to 10 μm and voids or channels having a mean diameter of from 1 to 10 μm, which voids or channels have a macroscopic volume as a proportion of the total particle in the range from 5 to 20%.

2. A propylene polymer as claimed in claim 1, wherein the silica gel used has voids and channels having a mean diameter of from 1 to 5 μm, which voids and channels have a macroscopic volume as a proportion of the total particle in the range from 5 to 15%.

3. A propylene polymer as claimed in claim 1 or 2, wherein the silica gel used has been spray dried.

4. A catalyst system as set forth in claim 1, wherein the further electron donor compound c) is an organosilicon compound of the general formula (I)

$$R^1{}_n Si(OR^2)_{4-n} \qquad (I),$$

where $R^1$ are identical or different and are each a $C_1$–$C_{20}$-alkyl group, a 5- to 7-membered cycloalkyl group which in turn can bear a $C_1$–$C_{10}$-alkyl group, or a $C_6$–$C_{20}$-aryl or arylalkyl group, $R^2$ are identical or different and are each a $C_1$–$C_{20}$-alkyl group and n is 1, 2 or 3.

5. The propylene polymer of claim 1, wherein the propylene polymer (I) is a propylene homopolymer.

6. The propylene polymer of claim 1, wherein the $C_2$–$C_{10}$-alk-1-ene is ethylene.

7. A process for preparing propylene polymers which comprise from 25 to 97% by weight of a propylene polymer (I) containing from 0 to 15% by weight of copolymerized $C_2$–$C_{10}$-alk-1-enes and also comprise from 3 to 75% by weight of a further propylene polymer (II) containing from 15 to 80% by weight of copolymerized $C_2$–$C_{10}$-alk-1-enes, obtained by two-stage polymerization of propylene and $C_2$–$C_{10}$-alk-1-enes in the presence of a Ziegler-Natta catalyst system which comprises a titanium-containing solid component a) comprising a compound of magnesium, a halogen, silica gel as support and a carboxylic ester as electron donor compound, and also as cocatalysts an aluminum compound b) and a further electron donor compound c), where, in a first polymerization stage, propylene is polymerized in the presence or absence of further $C_2$–$C_{10}$-alk-1-enes at from 50° to 100° C., pressures in the range from 15 to 40 bar and a mean residence time of from 0.5 to 5 hours and subsequently, in a second polymerization stage, a mixture of propylene and further $C_2$–$C_{10}$-alk-1-enes is polymerized at from 30° to 100° C., pressures in the range from 15 to 40 bar and mean residence times of from 0.5 to 5 hours onto the propylene polymer (I) obtained from the first polymerization stage, wherein the silica gel used as support for the titanium-containing solid component has a mean particle diameter of from 5 to 200 μm, a mean particle diameter of the primary particles of from 1 to 10 μm and voids or channels having a mean diameter of from 1 to 10 μm, which voids or channels have a macroscopic volume as a proportion of the total particle in the range from 5 to 20%.

8. A process as claimed in claim 7, wherein the polymerization is carried out at mean residence times of from 0.5 to 3 hours.

9. A process for using the propylene polymers of claim 1 as films, fibers and moldings.

* * * * *

UNITED STATES PATENT AND TRADEMARK OFFICE
CERTIFICATE OF CORRECTION

PATENT NO.: 5,773,516

DATED: June 30, 1998

INVENTOR(S): HUEFFER et al.

It is certified that error appears in the above-identified patent and that said Letters Patent is hereby corrected as shown below:

On the title page: Item

--[30] Foreign Application Priority Data
Dec. 6, 1995   [DE]   Germany ........... 195 45 498.7--.

Signed and Sealed this

Fourteenth Day of September, 1999

Attest:

Q. TODD DICKINSON

*Attesting Officer*     *Acting Commissioner of Patents and Trademarks*